US010703244B2

(12) United States Patent
Reith

(10) Patent No.: US 10,703,244 B2
(45) Date of Patent: Jul. 7, 2020

(54) MOTOR VEHICLE SEAT WITH AN INTEGRATED CHILD SEAT

(71) Applicant: Ford Global Technologies, LLC, Dearborn, MI (US)

(72) Inventor: Markus Reith, Köln/Northrhine-Westphalia (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 16/112,811

(22) Filed: Aug. 27, 2018

(65) Prior Publication Data

US 2019/0118691 A1 Apr. 25, 2019

(30) Foreign Application Priority Data

Oct. 25, 2017 (DE) .................. 10 2017 219 088

(51) Int. Cl.
| | |
|---|---|
| *B60N 2/26* | (2006.01) |
| *B60N 2/28* | (2006.01) |
| *B60N 2/90* | (2018.01) |
| *B60R 21/268* | (2011.01) |
| *B60R 21/233* | (2006.01) |
| *B60N 2/00* | (2006.01) |
| *B60R 21/30* | (2006.01) |

(Continued)

(52) U.S. Cl.
CPC .............. *B60N 2/914* (2018.02); *B60N 2/002* (2013.01); *B60N 2/0232* (2013.01); *B60N 2/0244* (2013.01); *B60N 2/22* (2013.01); *B60N 2/265* (2013.01); *B60N 2/2866* (2013.01); *B60N 2/2872* (2013.01); *B60N 2/2881* (2013.01); *B60N 2/32* (2013.01); *B60N 2/806* (2018.02); *B60R 21/2072* (2013.01); *B60R 21/233* (2013.01); *B60R 21/268* (2013.01); *B60R 21/30* (2013.01); *B60R 22/20* (2013.01); *B60N 2002/0268* (2013.01); *B60R 2021/23316* (2013.01); *B60R 2021/26094* (2013.01); *B60R 2022/1818* (2013.01); *B60R 2022/208* (2013.01)

(58) Field of Classification Search
CPC ...... B60N 2/914; B60N 2/806; B60N 2/0232; B60N 2/0244; B60N 2/22; B60N 2/265; B60N 2/32
USPC ............ 297/232, 233, 234, 235, 238, 250.1, 297/452.41
See application file for complete search history.

(56) References Cited

U.S. PATENT DOCUMENTS

| | | | | |
|---|---|---|---|---|
| 4,711,490 A | * | 12/1987 | Brand .................. | B60N 2/2806 297/250.1 |
| 5,292,175 A | * | 3/1994 | Artz ..................... | B60N 2/2806 297/250.1 |

(Continued)

FOREIGN PATENT DOCUMENTS

| | | | |
|---|---|---|---|
| DE | 3544041 A1 * | 6/1987 | ............. B60N 2/286 |
| DE | 4204224 C1 | 7/1993 | |

(Continued)

*Primary Examiner* — Rodney B White
(74) *Attorney, Agent, or Firm* — Frank A. MacKenzie; Bejin Bieneman PLC

(57) ABSTRACT

A motor vehicle seat with an integrated child seat comprises inflatable chambers that can be brought from a compressed air source. The child seat includes air chambers that are inflatable in multiple, e.g., three, stages, and which are fixed, e.g., adhesively bonded or stitched, to the surface of the motor vehicle seat.

9 Claims, 2 Drawing Sheets

(51) Int. Cl.
  *B60R 21/207* (2006.01)
  *B60N 2/806* (2018.01)
  *B60N 2/02* (2006.01)
  *B60N 2/22* (2006.01)
  *B60N 2/32* (2006.01)
  *B60R 22/20* (2006.01)
  *B60R 21/26* (2011.01)
  *B60R 22/18* (2006.01)

(56) References Cited

U.S. PATENT DOCUMENTS

| | | | | |
|---|---|---|---|---|
| 5,292,176 A * | 3/1994 | Artz | ............ | B60N 2/2806 |
| | | | | 297/250.1 |
| 5,335,968 A * | 8/1994 | Sheridan | ............ | A47D 1/004 |
| | | | | 297/250.1 |
| 5,516,188 A * | 5/1996 | Bruhnke | ............ | B60N 2/286 |
| | | | | 297/250.1 X |
| 6,601,916 B1 * | 8/2003 | Kamiki | ............ | B60N 2/2812 |
| | | | | 297/250.1 |
| 7,222,008 B2 | 5/2007 | Takahashi et al. | | |
| 7,284,792 B1 * | 10/2007 | Dabney | ............ | B60N 2/2812 |
| | | | | 297/452.41 X |
| 7,413,249 B2 | 8/2008 | Leutert | | |
| 8,528,983 B2 * | 9/2013 | Curto | ............ | A47D 1/103 |
| | | | | 297/452.41 |
| 8,579,372 B2 * | 11/2013 | Wessman | ............ | B60N 2/2806 |
| | | | | 297/250.1 |
| 8,733,833 B2 * | 5/2014 | Dickinson | ............ | B60N 2/2809 |
| | | | | 297/250.1 X |
| 8,897,968 B2 | 11/2014 | Suzuki | | |
| 8,905,477 B2 * | 12/2014 | Curto | ............ | A47D 1/103 |
| | | | | 297/250.1 |
| 9,457,838 B2 | 10/2016 | Tsunoda et al. | | |
| 9,707,868 B2 * | 7/2017 | Renaudin | ............ | B60N 2/002 |
| 9,796,303 B1 * | 10/2017 | Schonfeld | ............ | B60K 35/00 |
| 2003/0090134 A1 * | 5/2003 | James | ............ | B60N 2/2812 |
| | | | | 297/250.1 |
| 2007/0085394 A1 * | 4/2007 | Yang | ............ | B60N 2/914 |
| | | | | 297/250.1 |
| 2008/0100109 A1 * | 5/2008 | Frank | ............ | B60N 2/3081 |
| | | | | 297/238 |
| 2012/0228909 A1 * | 9/2012 | Blau | ............ | B60N 2/2806 |
| | | | | 297/238 |
| 2013/0015690 A1 * | 1/2013 | Mendis | ............ | B60N 2/2806 |
| | | | | 297/250.1 |
| 2016/0164447 A1 | 6/2016 | Wu et al. | | |
| 2019/0009695 A1 * | 1/2019 | Schonfeld | ............ | B60N 2/0292 |

FOREIGN PATENT DOCUMENTS

| | | | | |
|---|---|---|---|---|
| DE | 4327097 A1 * | 2/1995 | ............ | B60N 2/3081 |
| DE | 4403428 A1 | 8/1995 | | |
| DE | 10316816 A1 | 10/2004 | | |
| DE | 102013203978 A1 | 9/2014 | | |
| JP | 4382345 B2 | 12/2009 | | |
| WO | 2012135894 A1 | 10/2012 | | |

* cited by examiner

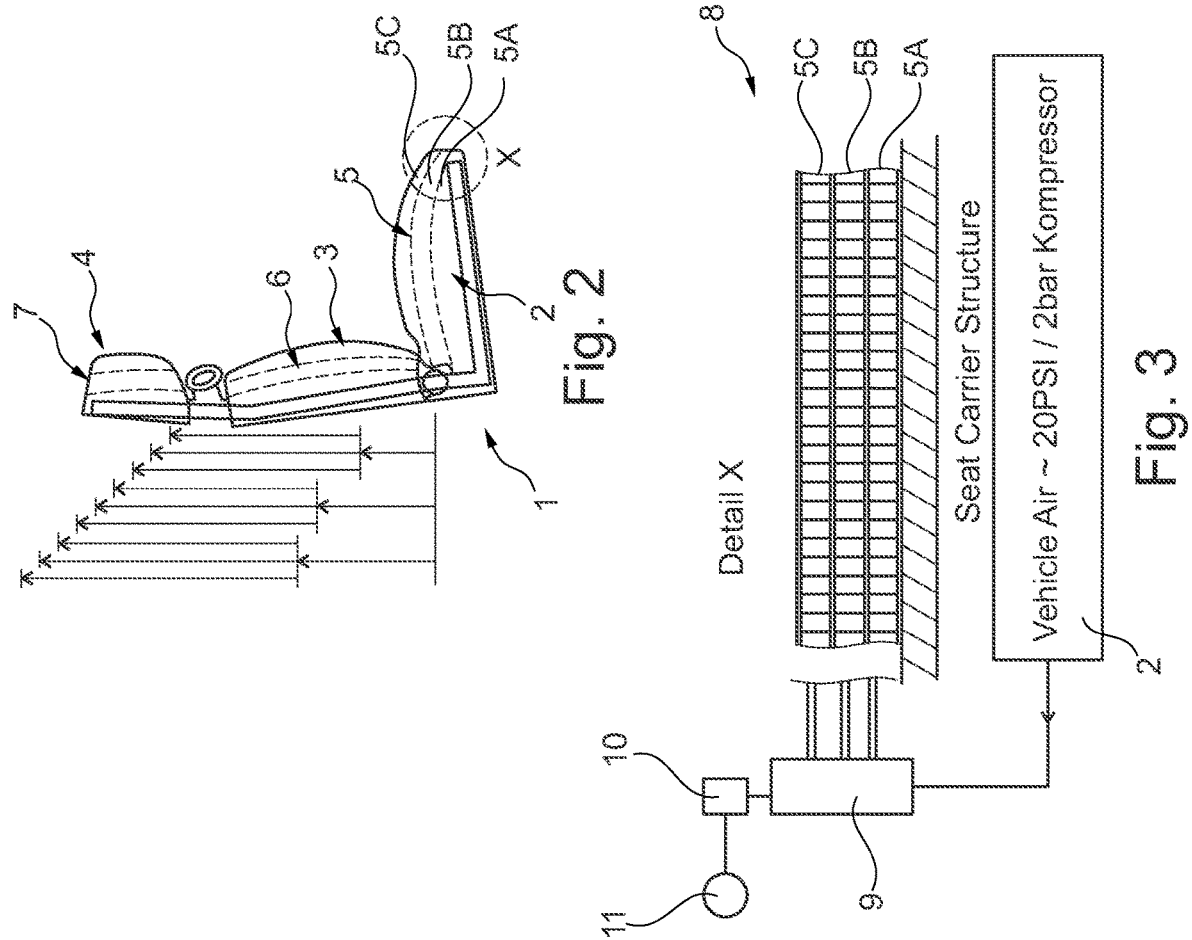

MOTOR VEHICLE SEAT WITH AN INTEGRATED CHILD SEAT

CROSS-REFERENCE TO RELATED APPLICATION

This application claims priority to German Application No. DE 102017219088.4, filed Oct. 25, 2017, which is hereby incorporated by reference in its entirety.

BACKGROUND

It is generally known to use specific safety devices, such as separate child seats, for children in motor vehicles.

This has the drawback that these child seats, which are often bulky, have to be continually carried in the vehicle even if no children are traveling in the vehicle, which is inconvenient, in particular, for taxis, etc.

An inflatable child seat with an integrated compressor is disclosed in WO 2012/135894 A1. DE 42 04 224 C1 also discloses an inflatable child seat with an integrated inflation device.

U.S. Pat. No. 7,413,249 B2 also discloses an inflatable child seat which is inflatable from a compressed air source and which is accommodated in a recess in the backrest of a vehicle seat and is inflatable out of said backrest.

DE 103 16 816 A1 discloses a similar approach, wherein the recess for receiving the folded child seat is configured in the transition region between the backrest and the seat cushion.

DE 44 03 428 A1 discloses a motor vehicle seat in which the seat surface is able to be lifted by applying pressure to a pocket arranged thereunder for the seating of children. Additionally, the motor vehicle seat may have an inflatable backrest part which has to be suspended on the posts of a head restraint.

DESCRIPTION

A motor vehicle seat with an integrated child seat, wherein the child seat includes inflatable chambers which can be brought from a compressed undeployed state into an inflated deployed state by means of a compressed air source. The motor vehicle seat thus provided with an integrated child seat has simplified handling and improved safety.

As disclosed herein, when the child seat includes air chambers which are inflatable in multi-stages, in particular in three stages, said air chambers being fixed, in particular adhesively bonded and stitched so as to be reinforced relative to one another, to the surface of the motor vehicle seat, it is possible to carry the child seat permanently in the vehicle without inconvenience and nevertheless use the child seat in a simple manner.

In other words, the inflatable chambers are directly applied to the surface of the usual seat cover and may be inflated in a targeted manner at that point, wherein it is possible to choose between three inflation sizes in which only one chamber, two chambers or all three chambers (and/or more in the case of a multi-stage embodiment) are inflated. Thus the size of the child seat may be adapted to the size of the child, which additionally increases the safety. With three stages, therefore, it is possible to achieve a more optimized seat adaptation for children in the stages 3-6 years, 7-9 years and 9-12 years. Thus the required biological and legal timeframe, after the so-called "baby cradle" stage and before the stage when there is no longer any requirement, is fully covered.

Preferably, the air chambers are cross-linked and are made, for example, of Kevlar-reinforced material. The outer layers are transversely stitched with the inner layers, in particular by reinforcing Kevlar yarns.

Expediently, individual air chambers are provided for the seat surface, head restraint and side ribs so that these air chambers are also adaptable.

For improved adaptation it is additionally possible that the head restraint and/or backrest are adjustable by motor, so that they are adaptable in terms of position to the size of the child.

In an example embodiment, the air chambers and/or the material thereof include superimposed layers. These layers may be inflated in a targeted manner, e.g., from inside to outside, in order to adjust the size.

To this end, it is possible that the motor vehicle seat comprises a controller, a multi-way valve, in particular a three-way valve, and a compressed air source, such that the controller is able to act in a targeted manner on the air chambers via the valve from the compressed air source. This may be carried out manually by pushing a button or automatically when the seat is occupied by a child. Then the motor vehicle seat may have weight and height sensors connected to the controller, in order to trigger the process of targeted inflation.

In order to adapt also the position of the seat belt, it is preferably provided that the motor vehicle seat comprises a seat belt guide which is adjustable by motor.

Further features and details of the invention are disclosed from the following description of the drawings, in which:

FIG. 2 shows a side view of the motor vehicle seat of FIG. 1; and

FIG. 3 shows a sectional view through the woven fabric in the region X of FIG. 2.

Figure 1:
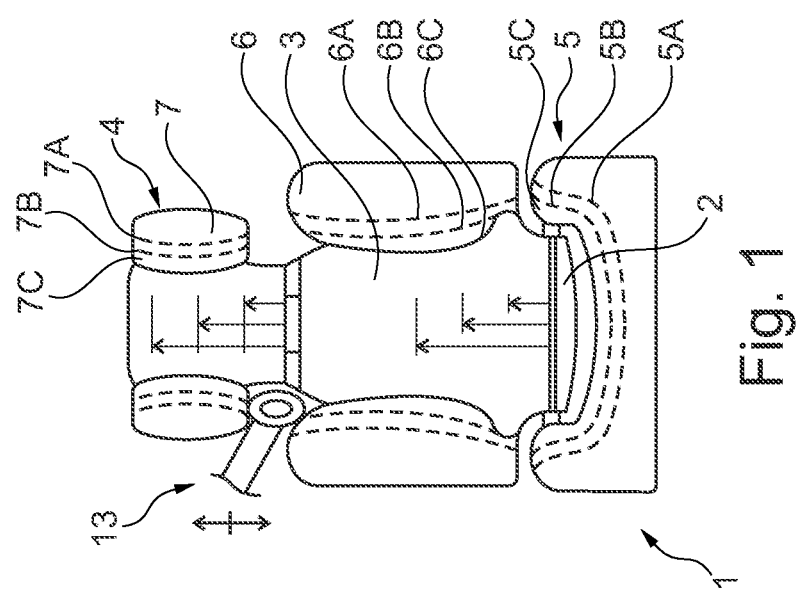
FIG. 1 shows a plan view of a motor vehicle seat with an integrated child seat.

A motor vehicle seat with an integrated child seat denoted as a whole by 1 is shown in the figures.

The motor vehicle seat 1 comprises a seat surface 2, a backrest adjacent thereto 3 and a head restraint 4.

The seat surface 2 is additionally provided with lateral ribs for the side support.

A second "skin", and also a "third skin" thereabove, are stitched onto the surface of the seat cover at suitable points 5, 6, 7 in order to configure the integrated child seat.

This forms air chambers which are inflatable in three stages A, B, C and which are inflatable from inside to outside in order to adapt the size of the child seat.

The seat height and the side support are adjusted by the chambers 5A, B, C.

The side support of the torso and the backrest length are adjusted via the backrest chambers 6A, B, C. To this end, the backrest 3 is additionally adjustable in height by motor.

The side support of the head and the upper body length of the child are adjusted by the head restraint chambers 7A, B, C. To this end, the head restraint 4 is additionally adjustable in height by motor.

Thus a plurality of adjustment stages are produced for children of different sizes, as is indicated with reference to the arrows in FIG. 2.

The woven fabric 8 of the chambers 5, 6, 7 includes three layers A, B, C connected together, wherein the intermediate space in each case forms one of the stages (see FIG. 3).

Each chamber can be subjected in a targeted manner to compressed air from the compressed air source 12 (compressor, etc.) via a three-way valve 9.

To this end a controller 10 is provided, the valve 9, the compressed air source 12 and the motorized drives for the backrest 3 and the head restraint 4 being activated thereby.

Additionally, weight and height sensors 11 are arranged in the seat surface and the backrest and/or head restraint, said sensors also being interconnected with the controller 10, so that when the seat is occupied by a child this controller is able to inflate the chambers 5, 6, 7 including the required layers A, B, C automatically and is able to move the backrest 3 and the head restraint 4 in an appropriate manner, wherein with the adaptation of the head restraint 4 a seat belt guide 13 which has been released at that point is also adjusted in terms of height.

The invention claimed is:

1. A motor vehicle seat comprising an integrated child seat, the child seat comprising:
    an inflatable chamber transformable from a compressed undeployed state into an inflated deployed state by a compressed air source,
    wherein the chamber includes a plurality of inflatable stages, each of the stages connected to, and separately inflatable by, the compressed air source and defined by respective layers of woven fabric that are each fixed to a surface of the motor vehicle seat,
    wherein a first stage includes a first intermediate space between the surface of the motor vehicle seat and a first layer of woven fabric, and a second stage includes a second intermediate space between the first layer of woven fabric and a second layer of woven fabric.

2. The motor vehicle seat of claim 1, wherein the woven fabric layers are cross-linked.

3. The motor vehicle seat of claim 1, wherein the chamber is one of a plurality of individual air chambers that are provided for a seat surface, a backrest, a head restraint, and side ribs of the integrated child seat.

4. The motor vehicle seat of claim 3, wherein at least one of the head restraint or backrest is adjustable by motor.

5. The motor vehicle seat of claim 1, further comprising a controller, a multi-way valve, and a compressed air source, such that the controller can act in a targeted manner on the inflatable chamber via the valve from the compressed air source.

6. The motor vehicle seat of claim 5, wherein the multi-way valve is a three-way valve.

7. The motor vehicle seat of claim 5, further comprising weight and height sensors connected to the controller.

8. The motor vehicle seat of claim 1, further comprising a seat belt guide which is adjustable by motor.

9. The motor vehicle seat of claim 1, wherein the plurality of stages is three stages.

* * * * *